United States Patent

Eisen

(10) Patent No.: US 9,412,123 B2
(45) Date of Patent: Aug. 9, 2016

(54) KEYSTROKE ANALYSIS

(75) Inventor: Ori Eisen, Glendale, AZ (US)

(73) Assignee: The 41st Parameter, Inc., Scottsdale, AZ (US)

( * ) Notice: Subject to any disclaimer, the term of this patent is extended or adjusted under 35 U.S.C. 154(b) by 976 days.

(21) Appl. No.: 10/612,375

(22) Filed: Jul. 1, 2003

(65) Prior Publication Data

US 2005/0216278 A1    Sep. 29, 2005

(51) Int. Cl.
*G06F 21/00*    (2013.01)
*G06Q 30/06*    (2012.01)
*G06Q 40/00*    (2012.01)

(52) U.S. Cl.
CPC ................ *G06Q 30/06* (2013.01); *G06Q 40/00* (2013.01)

(58) Field of Classification Search
CPC ..................................................... G06Q 20/382
USPC ....................................................... 705/50–79
See application file for complete search history.

(56) References Cited

U.S. PATENT DOCUMENTS

| | | | |
|---|---|---|---|
| 4,805,222 A * | 2/1989 | Young ................... | G06F 21/316 340/5.51 |
| 5,557,686 A * | 9/1996 | Brown et al. ................. | 382/115 |
| 5,721,765 A | 2/1998 | Smith | |
| 6,062,474 A | 5/2000 | Kroll | |
| 6,151,593 A * | 11/2000 | Cho et al. ........................ | 706/16 |
| 6,405,922 B1 * | 6/2002 | Kroll .............................. | 235/379 |
| 6,442,692 B1 | 8/2002 | Zilberman | |
| 6,509,847 B1 | 1/2003 | Anderson | |
| 6,895,514 B1 * | 5/2005 | Kermani ............... | G06F 21/316 726/19 |
| 7,003,670 B2 | 2/2006 | Heaven et al. | |
| 7,043,640 B2 | 5/2006 | Pritchard et al. | |
| 2003/0140258 A1* | 7/2003 | Nelson et al. ................. | 713/202 |
| 2007/0239604 A1 | 10/2007 | O'Connell et al. | |

OTHER PUBLICATIONS

International search report dated Jun. 13, 2008 for PCT Application No. US2005/020750.

* cited by examiner

*Primary Examiner* — James A Reagan
(74) *Attorney, Agent, or Firm* — Knobbe, Martens, Olson & Bear, LLP

(57) ABSTRACT

A system, method and device for detecting keystroke entries in a field entered by keyboard in connection with an online transaction that may be fraudulent or erroneous. A score can be assigned to a keystroke based upon its distance from another keystroke. The scores of keystrokes in a string can be summed to obtain a string score. The string score can be normalized by dividing the string score by the number of keystrokes summed to obtain the normalized string score. A risk of fraud or error can be determined based upon the value of the normalized string score in comparison to a predetermined value.

20 Claims, 1 Drawing Sheet

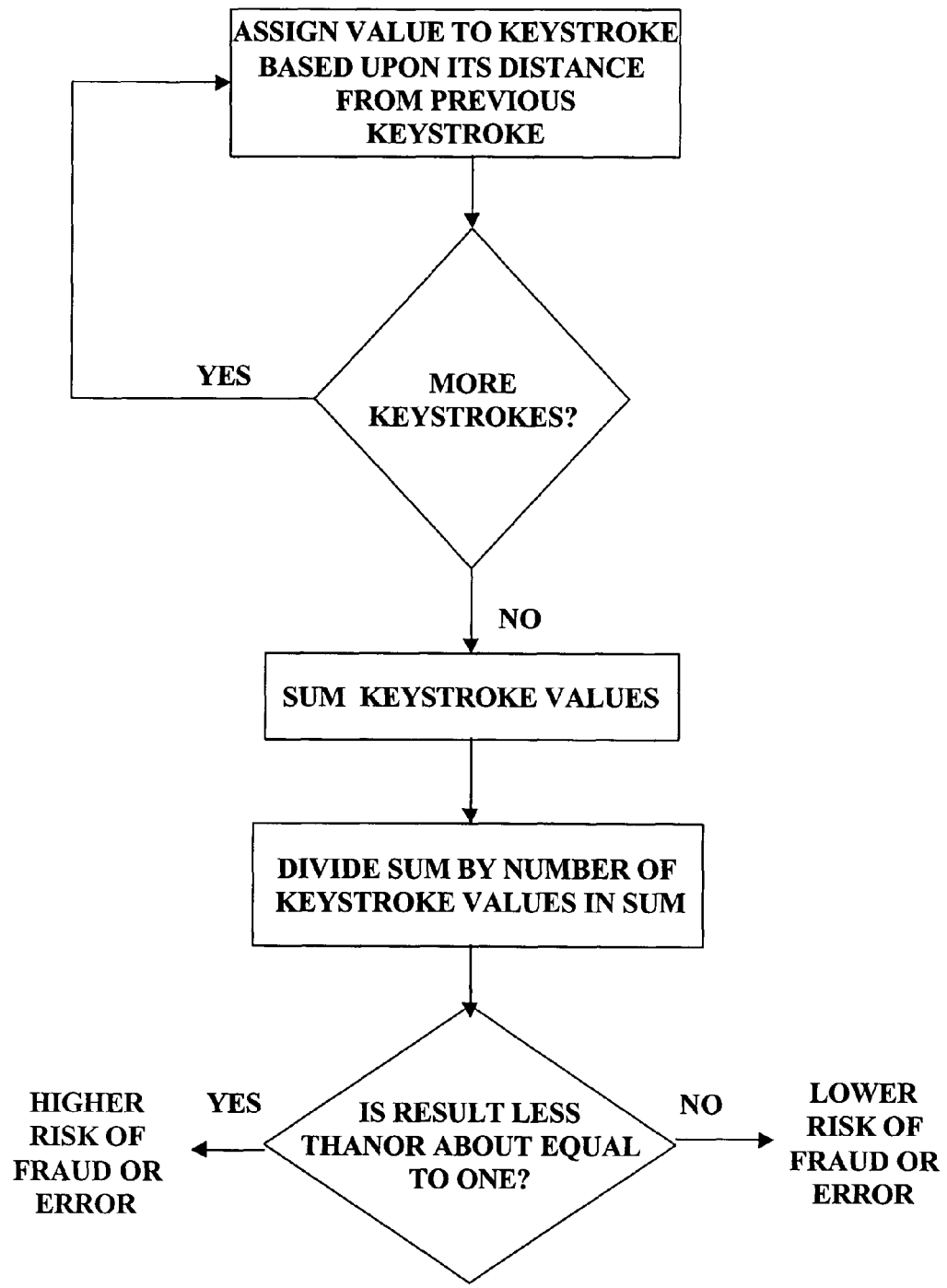

KEYSTROKE ANALYSIS

FIELD OF THE INVENTION

This invention concerns keystroke analysis, and in particular the use and analysis of keystrokes made on a keyboard-like data input device for detecting the erroneous or fraudulent entry of data.

BACKGROUND OF THE INVENTION

Online transactions frequently require a user to enter information using a keyboard or a keyboard-like device (hereinafter collectively referred to as "a keyboard"). An "online transaction" is any communication between an electronic communication location, for example, a website and a user or consumer. The communication can take a variety of forms, e.g., the entry by the consumer of information in a website's survey; an agreement to buy merchandise; a contest, sending a message via e-mail, etc. that is executed in whole or in part via a keyboard and electronically. A more specific example of an online transaction is an agreement to pay in exchange for the shipment of a product, i.e., a consumer's purchase. As used herein, a "product" can be goods and/or services. Another specific example of an online transaction is the completion of an online survey, e.g., the completion of a form provided through a web site over the Internet. The survey may be desired by the web site owner for a variety of reasons, e.g., marketing analysis, generation of a mailing list, effectiveness of marketing/advertising, etc. Sometimes, these surveys offer "rewards" or prizes to one, some or all of the entrants. Yet another example of an online transaction is the entry of personal profile information by a user using an interface device, like a keyboard, provided by a web site over the Internet. A keyboard can include any device used to enter alphanumeric information by a user.

Online transactions include the entry of information through an online form. The form can have certain fields that the user is required to complete. Examples of fields are a name field; an address field; a credit card number field; a credit card expiration date field; etc. When a user enters a survey, a contest, or is registered for a purchase by completing a form, the user may be presumed by a vendor or other online authority to be a legitimate party with which to engage in an online transaction.

A legitimate user engaged in an honest online transaction typically enters information into the required fields by pressing keys at varying locations on the keyboard that correspond to letters and/or numbers corresponding to the user's true name, address, telephone number, credit card number, etc. As used herein, a "keystroke" is a character produced by activating (e.g., depressing) a key of the keyboard. For example, the keystroke "a" results from pressing the "a" key on a keyboard in lowercase mode, while the keystroke "A" results from pressing the "a" key on a keyboard in the uppercase mode (ordinarily achieved by simultaneously depressing the "Shift" key and the "a" key of the keyboard). The "location of a keystroke" is the location of the key that is depressed or activated to generate the keystroke. For example, the location of the keystroke "a" corresponds to the location of the "a" key on a standard keyboard, which is typically next to the "s" key and under the "q" key on a standard QWERTY keyboard. Of course, the present invention can be adopted for other keyboard configurations. Likewise, the distance between keystrokes is deemed to be the shortest distance in keys, whether vertical, horizontal or diagonal, between the keys that are depressed or activated to produce the keystrokes. This can be measured in any suitable fashion, such as the actual number of intervening spaces between keys or the actual linear distance in millimeters between keys, etc. For example, on a QWERTY keyboard, the distance between the "a" and "s" keystrokes is deemed 1 as there is a single intervening space between those keys. Thus, the distance between the "a" and the "d" keystrokes is deemed, for the purpose of the present invention, 2 keys, since there are two intervening key spaces between those individual keys, etc. The distance between an "f" and a "t" or between an "h" and a "t" is deemed 1, again, because there is one space between those keys of the standard QWERTY keyboard. Alternatively, the linear distance between the "a" and the "s" keystrokes on a QWERTY keyboard is about 2 centimeters; the distance between the "a" and the "d" keystrokes is about 4 centimeters (two spaces); etc. Of course, these concepts can apply to any keyboard, not just a QWERTY keyboard. For example, a cell phone has a keyboard, denominated a keypad with keys that correspond to numbers and letters. On a cell phone keypad, the keystrokes "a", "b" and "c" all correspond to the "2" key, so the distance between those keystrokes is deemed zero. The distance between the "a" and "t" keystrokes can be 2 keys since the number of spaces between those two keys on a keypad numbers 2 or in linear dimension, about 0.8 centimeters (0.4 centimeters per space), etc.

A fraudulent user engaged in a dishonest online transaction is typically interested in filling in the fields required on an online form as quickly as possible. This allows access to information, provides for a fraudulent purchase, or multiple (and thus contrary to the rules) entries into a contest. Since the fraudulent user is not concerned with the accuracy of the information entered into the fields, the keystrokes need not be at substantially different locations on the keyboard.

BRIEF DESCRIPTION OF THE DRAWINGS

FIG. 1 is a flowchart showing the method in accordance with an embodiment of the present invention.

DETAILED DESCRIPTION OF THE DRAWING AND PREFERRED EMBODIMENT

An embodiment of the present invention can detect the entry of information that is likely to be part of a fraudulent online transaction based upon the relative locations of the keystrokes used to enter the information into one or more fields. For example, many online forms for contests only require that a field in a form not be left blank to accept an entry. A fraudulent user (a "fraudster") realizes this, and often seeks to enter keystrokes as quickly as possible, without regard to their meaning. The quick entry of this fraudulent information may allow the fraudster to submit multiple contest entries, for example. The present invention seeks to determine the presence of fraudulent online transaction. To enter information quickly, then, a fraudulent user or fraudster will often enter data into the field(s) by placing one hand on the keyboard and randomly entering keystrokes that are located near to each other. An embodiment of the present invention capitalizes on this fact to detect actually or potentially fraudulent data entered by a user.

In an embodiment of the present invention, a numerical value is assigned to each keystroke. The numerical value of a second or succeeding keystroke is based upon the distance of the second or succeeding keystroke from the first or preceding keystroke, preferably the immediately previously entered keystroke. An arbitrary value can be assigned to the first keystroke. For example, if the first keystroke is "a", then it can be assigned an integer value, such as 1. An integer is any of the positive and negative whole numbers and zero, i.e., [ . . . −2, −1, 0, 1, 2, . . . ] The second keystroke can be assigned a value equal to the number of keyspaces between the first and second keystrokes. Thus, if the second keystroke is a "d", then the second keystroke can be assigned a value ("score") of 2, because on the QWERTY keyboard, the "d" key is two key spaces away from the "a" key, i.e., a single key "s" is between the "a" key and the "d" key with that "s" key having a space on each of its sides to separate it from the "a" and "d" keys. If the third keystroke is also a "d", it will be assigned a score of 0, because it is 0 keystrokes or spaces away from the second keystroke, which was also a "d." If the fourth keystroke depressed by the user is an "s," it will be assigned a score of 1, because the "s" key is one key space separated from the "d" key. If the fifth keystroke is an "e", it will be assigned a value or score of 1, because it is one diagonal key space separated from the "s" key. This is how the present invention preferably assigns values to each keystroke entered by a user.

Of course, other methods of assigning values or scores to second and successive keystrokes can be employed without departing from the scope of the present invention. For example, a percentage difference from two keys next to each other can be employed, by capitalizing on the diagonal distance between depressed keys. For example, although an "a" and "s" are one key space apart from one another and the "a" and "w" are also one key space apart, the inventor further contemplates assigning a value of 1 to the "a" to "s" keyspace between the keys and a weighted value of 1.25, for example, for the "a" to "w" keyspace between those keys, because they appear on different rows of the keyboard. Other manners of valuing second and successive keystrokes from the first and following keystrokes are contemplated and all within the scope of the present invention.

The scores of all keystrokes used to enter information in a field of a form of an online transaction can be summed in accordance with the present invention. One or more keystrokes is called a "string". The sum of the keystroke scores of a string is called a "string score". The number of keystrokes or keys depressed by the user in a string is called its "length." For the example above, the string "addse" has a string score of 1+2+0+1+1=5, and a length of 5 (since 5 separate keystrokes were depressed to form the string). A string score is "normalized" when its string score is divided by its length. So, in the example, the normalized string score for the string "addse" above is 5/5=1. This value for the normalized string score is typical for strings made of keystrokes entered by a fraudster. That is, strings made of essentially randomly entered keystrokes that are relatively close to each other have string scores that are approximately equal to the lengths of the strings. Another example is the string "dddddddddd", which has a normalized string score of 0.1, since the first keystroke is assigned a value or score of 1 and all of the subsequent keystrokes are assigned the value or score of 0. The sum of the keystrokes, the string score, is then 1+0+0+0+0+0+0+0+0+0 or 1. The length of the string is 10. The normalized string score is 1 divided by 10 or 10/1=0.1. In other words, such nonsense or fraudster type strings typically have normalized string scores about equal to, or less than, one.

On the other hand, strings that are made from keystrokes that correspond to real information typically have larger score sums than their lengths, because successive keystrokes are often located at more mutually distant locations on the keyboard. In other words, the normalized string score for legitimate strings is often greater than 1. For example, the name ELLEN has a string score of 1+6+0+6+4=17 (based on the number of spaces between the keys), a length of 5 (based on the number of keys depressed to form the string) and thus a normalized string score of 17/5=3.4.

In accordance with an embodiment of the present invention, a string having a normalized string score sum less than or equal to about 1 can indicate an entry by a fraudulent user, while a score substantially above 1 can indicate a legitimate entry. In practice, it has been found that, generally, a normalized string score sum that is less than or about equal to 1.25 can indicate a likely fraudulent entry; a normalized string score sum greater than 1.25 yet less than or equal to about 1.5 can indicate a moderate likelihood (risk) of fraud; and a normalized string score sum greater than about 2 can indicate a smaller likelihood of a fraudulent or mistakenly entry into the data field. Thus, entries into fields can be categorized into high, medium and low risk levels of fraud or mistake.

The normalized string scores of two or more strings belonging to, say, the same online transaction can be aggregated to generate a high, medium or low level of risk that applies to the entire transaction. For example, the normalized string scores of some or all of a group of strings (e.g., the entries in a transaction (name, address, etc.)) can be summed to obtain a transactional score, and when divided by the number of entries (fields) in the sum to obtain a normalized transactional score. If this result is less than or equal to about 1, then the online transaction is likely a high risk of being fraudulent; if it is greater than 2, it is likely a low risk of being fraudulent; and, if otherwise, it can be "flagged" for further investigation. In this way, the entire online transaction can be rejected if a high risk level is shown in accordance with an embodiment of the present invention; accepted if a low risk is indicated; or the transaction can be flagged for further study if a moderate level of risk is detected. Likelihood (risk) of fraud can be determined in terms of a percentage measurement (e.g., 25% probability of fraud, 60% probability of fraud, etc.); risk levels (e.g., low, medium, high; acceptable, unacceptable; suspicious, etc.); or any other suitable way. These risk determinations can be associated with a single string or sets of strings and stored.

Strings entered in the course of an online transaction can advantageously be stored in a database. The strings associated with a single transaction can be stored as a single record. The string score and transactional score can be associated with the record corresponding to the strings and transactions to which the scores pertain. Thus, a risk level can be associated with a specific record. For example, a credit card number that is entered along with several strings with normalized scores equal to about 1 can be placed into a database of highly suspect information. The credit card number can be reported as possibly stolen, or other transactions that use that credit card number can be temporarily canceled or blocked until the legitimate holder of the credit card or the credit card company is first notified.

A single field with a normalized value of about 1 may not indicate fraud. For example, the legitimate name FRED can have a string score of 1+1+1+1=4, a string length of 4 and thus a normalized score of 4/4 or 1. Thus, the present invention encompasses setting various thresholds, as appropriate, for classifying a user as potentially suspect. For another example, a user can be classified as suspect when two or more; three or more; four or more, etc. fields have normalized string scores that fall between 0.5 and 1.5 (a gap of 1.0); or between 0.75 and 1.25 (gap of 0.5); or 0.9 and 1.1 (a gap of 0.2); etc. This can advantageously "tune" the sensitivity of the present invention. For example, requiring more fields to have normalized scores about equal to 1 for a user to be categorized as "suspect" can diminish the sensitivity of the fraud detection in accordance with an embodiment of the present invention.

Narrowing the gap between the lower and upper normalized score values within which a normalized score must fall to be a suspect value can have the same effect. Requiring fewer fields to be determined as suspicious and/or widening the value of the gap can increase the method's sensitivity. Thus, an embodiment of the present invention can be advantageously adjusted to take into account the particular needs and policies of the authority seeking to detect fraud. An authority that is eager to avoid false positives (i.e., one where there is little financial risk of loss if the entry is fraudulent) can adjust the tolerance to a lower sensitivity, while an authority that wishes to rigorously prevent fraud because of the loss of large amounts of goods and/or money has a greater tolerance for false positives and may adjust the parameters to increase sensitivity. A "false positive" occurs when a legitimate user is incorrectly classified as a fraudulent user.

The present invention produces good results regardless of the starting position of the hand that types the information, and for either the right or left hand. For example, a user places his left hand in the conventional position for a QWERTY-style keyboard, with his left index finger resting on the "f" key, his second finger on the "d" key, his ring finger on the "s" key and his pinky on the "a" key, etc. Suppose the user is a fraudster, so he types a random string of letters convenient to the placement of his left hand, e.g., "wessf". If the first keystroke is assigned an arbitrary value of 1, and if the distance between keystrokes is measured in spaces between keys, then the string score is 1+1+1+0+2 or 5. Since there are five keystrokes, the normalized string score is 5/5 or 1. If the fraudster types the same pattern but with a different hand position, the string score and normalized string score will be the same. For example, if the fraudster uses his right hand in the position where his right index finger rests on the "j" key, the second finger on the "k", and the right hand pinky on the ";" key, the same typing pattern produces the string "uijjl". This string also has a string score of 5 and a normalized string score of 1. So, an embodiment of the present invention advantageously detects key entries that may be fraudulent regardless of the position of the hand on the keyboard or which hand is used for the entry.

FIG. 1 is a flowchart in accordance with an embodiment of the present invention. A value is assigned to a keystroke based upon its distance from the previous keystroke (201). This can be repeated for any number of keystrokes (202). The values of the keystrokes are summed (203) and then normalized by dividing the sum or string score by the length of the string, i.e., the number of keystrokes (204). The resulting normalized sum indicates a higher likelihood of fraud or error if it is about equal to or less than one, and a lower likelihood of fraud or error if it is larger than one, as described above.

The present invention can advantageously take into account the fact that the use of the shift key for capitalization may indicate a reduced likelihood of fraud or error. A fraudster who simply wants to enter keystrokes simply to complete an entry or field of a form typically does not bother depressing the shift key for a single keystroke, while a legitimate user may wish to capitalize the first letter of a name, use a shift character (e.g., the "!" on the "1" key, the "@" on the "2" key, etc.). A keystroke made while the shift key is depressed (or locked) is denoted shift+keystroke, e.g., shift+a. A keystroke made while the shift key is depressed or locked can also be denoted by the character it produces. For example, shift+a=A, shift+1=!, etc. A shift+keystroke can be called a "shifted keystroke."

An embodiment of the present invention takes the shift key into account by adding an extra amount to the value of a shifted keystroke. This extra amount is added to the value assigned to a keystroke based upon its distance from the previous keystroke. For example, in a string, "d" as the first letter or keystroke is assigned a value of 1, and since "a" is two key spaces away from "d", i.e., separated by a single key with spaces on its sides, "a" is assigned a value of 2, just as before described. Likewise, the next keystroke "q" is assigned a value of 1, because it is one key space distance from "a". Thus, the string value for "daq" is 1+2+1=4. The string length is 3. The normalized string value is 4/3=1.33. For the string "Daq" (i.e., shift+d,a, and q) an extra value of 1 is added to the shifted keystroke "D" because the shift key was used. The string score for Daq is therefore 2+2+1=5, the string length remains as 3 and the normalized string score is 5/3=1.67. Since the normalized score is greater for "Daq" than "daq," it appropriately indicates that the risk of fraud or error for "Daq" is smaller than that for "daq." The enhanced value added to the score of a keystroke because it is shifted can be an integer (e.g., 1, 2, 3, etc.) or any other real number (e.g., 1.43, 4.6. etc.).

The scoring rule(s) for keystrokes involving the shift key can be further refined by taking into account a locked shift key, or multiple shifted keystrokes that may not indicate a lesser likelihood of fraud or error than a string score based exclusively on distance from the previous keystroke. For example, if all of the keystrokes in a string are shifted, e.g., "DAQ," then no additional value is added to the distance-based keystroke values. So "DAQ" can have the same string score as "daq." Likewise, indications that a shift key is being randomly depressed can also be taken into account. A rule can be implemented such that no additional value is added to a shifted keystroke if at least one (or at least two, two of three, or at least three, etc.) contiguous keystrokes in the string are also shifted. In other words, an extra value can be added to the "D" in "Daq," but no extra value will be added to either "D" or "Q" in the string "DaQ," or "DAQ" because a rule is implemented that no enhanced value will be attributed to any shifted key that is part of a contiguous set of two of three or three or more consecutive shifted keys in the string. In another example, the "D" and "A" have the value 1 added to each of the D and the A for totaling keystroke scores in the string DAqui, but the shifted keys D and A and Q will not have any value added to them in the string DAQui, because a rule is implemented that no enhanced value will be added to any shifted keystroke that is part of a contiguous set of three or more shifted keystrokes. Other rules can be envisioned that take into account the shift key. For example, a string with more than a predetermined fraction of its keystrokes shifted may be valued without adding enhanced values to the shifted keystrokes; a string that includes more than a predetermined number of shifted keystrokes or a percentage of the overall keystrokes may be valued without adding enhanced values to the shifted keystrokes; etc.

An embodiment of the present invention can be embodied in software adapted to be executed by a processor. A processor may be coupled to a memory storing keystroke fraud instructions that are adapted to be executed by the processor to perform the method in accordance with an embodiment of the present invention. Although the instructions are termed "fraud instructions," they can also detect the risk of an erroneous entry of keystrokes. The processor can be a general purpose microprocessor, such as the Pentium IV processor manufactured by the Intel Corporation of Santa Clara, Calif., or an Application Specific Integrated Circuit (ASIC) that embodies at least part of the method in accordance with an embodiment of the present invention in hardware and/or firmware. An example of an ASIC is a digital signal processor. Memory can be any device that can store computer-readable information, such as Random Access Memory (RAM); Read Only Memory (ROM); a hard disk; a CD-ROM; flash memory; etc. Keystroke fraud instructions can also be carried on a medium, which can include memory and/or a telecommunications channel.

In one embodiment of the present invention, the keystroke fraud instructions are executed on a client machine to which the entries made on a remote keyboard are coupled. Upon execution, the instructions examine strings of keystrokes entered by a user and sets a "flag" indicating a likelihood of fraud or mistake associated with a string or set of strings. In another embodiment, a string or set of strings is analyzed by the processor at the user's end and only after it is determined as not likely to be fraudulent are the field entries sent to the web site. The keystroke fraud server sends a message to the web site server indicating a likelihood of fraud associated with the string or set of strings. In yet another embodiment, numerous strings are stored on a medium (e.g., a database on a hard disk; carried over a telecommunications channel and stored on a memory; etc.) and are analyzed by a computer having a processor executing the keystroke fraud instructions. This can occur shortly after or some time after the strings have been entered by one or more users. The strings and sets of strings are analyzed, and the likelihood of fraud associated with each string and/or set of strings can be recorded.

The above description is meant to illustrate, and not to limit, the scope of the present invention. One skilled in the art will readily appreciate that other embodiments of the present invention can be used, instead of those described above. For example, the distance between keys can be characterized in different ways than the shortest number of jumps needed to get from one key to another or the linear distance. A value should be assigned to a keystroke such that the absolute magnitude of the value is larger when the space, linear or keyboard distance between the given keystroke and a previously entered keystroke such that the greater distance corresponds to a greater value for the keystroke, and smaller when the distance is smaller; summing the values of several keystrokes; and normalizing the resulting sum to that longer set of keystrokes with the same relative positions as smaller sets of keystrokes produce about the same normalized value. Also, the value assigned to a keystroke need not be based upon the distance of the keystroke from an immediately previous keystroke. A value of a keystroke can also be based upon the distance of a subsequently typed keystroke from a predetermined positioned keystroke, e.g., all distances are determined from the third keystroke, ignoring the first two. Further, the value assigned to a keystroke need not always be based upon the distance of the keystroke from a consecutive (preceding or following) keystroke. In some cases, the value can be based upon the distance from the keystroke to another keystroke entered some keystrokes prior or subsequent. Further, scores of keystrokes can be manipulated such that a larger normalized string score indicates a lower likelihood of fraud than a smaller normalized string score. For example, a normalized string score can be inverted.

The present invention can also detect entries that have been entered in an erroneous fashion, and transactions that contain erroneous entries. Also, the present invention can be used to detect and ignore keyboard entries made accidentally to a wireless device while it is carried in a user's pocket or purse. When another object near the wireless device presses on the keypad, nearby keys can often be depressed, sometimes repeatedly. A number can unintentionally be dialed on the wireless device, or data can be inadvertently entered. The present invention can advantageously detect entries of keystrokes near to each other, and selectively ignore them. For example, a rule can be implemented to the effect that a string of nearby keystrokes should be ignored, unless they appear on an exception list stored at or accessible to the wireless device. In another embodiment, the rule can be to ignore a string of nearby keystrokes that do not begin with one or more predetermined strings, such as an access digit (such as "1") and a recognized, stored or preauthorized area code.

These and other embodiments would be understood by one of ordinary skill in the art to be encompassed by the present invention.

What is claimed is:

1. A computer-implemented method for determining potential fraud in an electronic input of data via a keyboard during an online session, the method comprising:

providing an electronic online form during an online session for an online transaction, the electronic online form comprising one or more user input fields, wherein electronic data entered into the one or more user input fields can be authenticated to detect fraudulent data entry;

obtaining keyboard configuration information regarding a configuration of a keyboard of a user device, the keyboard configuration information comprising, for each pair of keys on the keyboard, a distance value indicating a respective number of spaces between the pair of keys;

initiating a fraud detection algorithm, comprising:

for each field of the one or more user input fields:

accessing a field data string input into the field, the field data string comprising a plurality of ordered keystrokes $k_1, k_2 \ldots k_n$ that have been entered into the field via the keyboard of the user device:

assigning a score to a first keystroke $k_1$ of the plurality of ordered keystrokes based at least on whether the keystroke $k_1$ includes a shift key, wherein a determination that the keystroke $k_1$ includes the shift key increases the score; and to each of the remaining keystrokes $k_2 \ldots k_n$ based at least on:

(1) a distance value of the keyboard configuration information for the respective keystroke and the pervious keystroke, wherein a larger distance value results in the score having a higher value, and (2) whether the respective keystroke includes a shift key, wherein a determination that the respective keystroke includes the shift key increases the score;

summing the scores of at least three of the plurality of ordered keystrokes to generate a field data string score;

dividing the field data string score by a count of the scores used to determine the field data string score to obtain a normalized field data string score; and comparing the normalized field data string score to a predetermined value for normalized data string scores to generate a field risk value that indicates a risk that the keystrokes associated with the normalized field data string score were entered without regard to their meaning and are potentially fraudulent;

determining a transactional score based at least in part on one or more field risk values corresponding to the one or more user input fields;

determining, based on the transactional score, whether the online transaction is potentially fraudulent; and in response to a determination that the online transaction is potentially fraudulent, segregating the online transaction for separate action.

2. The computer-implemented method of claim 1, wherein there are at least two intervening keystrokes between keystrokes $k_1$ and $k_n$.

3. The computer-implemented method of claim 1, wherein the score for each keystroke $k_2 \ldots k_n$ is a whole number plus a least number of adjacent key spaces between the respective keystroke and the previous keystroke.

4. The computer-implemented method of claim 1, wherein the score of keystroke $k_2$ is based upon a linear distance between keystrokes $k_1$ and $k_2$.

5. The method of claim 1, wherein determining the transaction score comprises: summing the normalized field data string scores corresponding to the one or more user input fields to obtain the transactional score.

6. The computer-implemented method of claim 5, wherein determining, based on the transactional score, whether the online transaction is potentially fraudulent comprises:
    dividing a sum of the normalized field data string scores by a count of strings in the sum to obtain a normalized transactional score; and
    comparing the normalized transactional score to a predetermined value for normalized transactional scores to generate a transaction risk value.

7. The computer-implemented method of claim 6, further comprising:
    comparing the normalized transactional score to a second predetermined score indicative of possible fraud or error; and
    indicating (1) a low risk level when the normalized transaction score exceeds both the predetermined score and the second predetermined score, (2) a high risk level when the normalized transaction score does not exceed the predetermined score and does not exceed the second predetermined score, and (3) a moderate risk level when the normalized transaction score only exceeds one of the predetermined score or the second predetermined score.

8. The method of claim 1, further including classifying the user as a potentially suspect when two or more of the plurality of strings have normalized string scores falling beneath the predetermined value of normalized string scores.

9. An apparatus for determining potential fraud in an electronic input data via a keyboard during an online session, said apparatus comprising:
    a fraud detection server system comprising one or more processors configured to execute instructions stored in modules; and
    a memory in electronic communication with said one or more processors, said memory storing:
        an application module configured to conduct an online transaction with a user over a network via a user device of the user, and comprising instructions that, when executed by the one or more processors of the fraud detection server system, include:
            providing an electronic online form during an online session for the online transaction, the electronic online form comprising one or more user input fields, wherein electronic data entered into the one or more user input fields can be authenticated to detect fraudulent data entry; and
        a keyboard fraud input detection module stored in the non-transitory memory and comprising instructions that, when executed by the one or more processors of the fraud detection server system, include:
            obtaining keyboard configuration information regarding a configuration of a keyboard of the user device, the keyboard configuration information comprising, for each pair of keys on the keyboard, a distance value indicating a respective number of spaces between the pair of keys;
            initiating a fraud detection algorithm that when executed by the one or more processors of the fraud detection server system, performs at least the following:
                for each field of the one or more user input fields:
                    accessing a field data string input into the field, the field data string comprising a plurality of ordered keystrokes $k_1, k_2 \ldots k_n$ that have been entered into the field via the keyboard of the user device;
                    assigning a score: to a first keystroke $k_1$ of the plurality of ordered keystrokes based at least on whether the keystroke $k_1$ includes a shift key, wherein a determination that the keystroke $k_1$ includes the shift key increases the score; and to each of the remaining keystrokes $k_2 \ldots k_n$ based at least on: (1) a distance value of the keyboard configuration information for the respective keystroke and the previous keystroke, wherein a larger distance value results in the score having a higher value; and (2) whether the respective keystroke includes the shift key, wherein a determination that the respective keystroke includes the shift key increases the score;
                    summing the scores of at least three of the plurality of the ordered keystrokes to generate a field data string score;
                    dividing the field data string score by a count of the scores used to determine the field data string score to obtain a normalized field data string score; and
                    comparing the normalized field data string score to a predetermined value for normalized data string scores to generate a field risk value that indicates a risk that the keystrokes associated with the normalized field data string score were entered without regard to their meaning and are potentially fraudulent;
                determining a transactional score based at least in part on one or more field risk values corresponding to the one or more user input fields;
                determining, based on the transactional score, whether the online transaction is potentially fraudulent; and
                in response to a determination that the online transaction is potentially fraudulent, segregating the online transaction for separate action.

10. The apparatus of claim 9, wherein determining the transactional score comprises: summing the normalized field data string scores corresponding to the one or more data field to obtain the transactional score.

11. The apparatus of claim 10, wherein determining, based on the transactional score, whether the online transaction is potentially fraudulent comprises:
    dividing the sum of the normalized field data string scores by a count of strings in the sum to obtain a normalized transactional score; and
    comparing the normalized transactional score to a predetermined value for normalized transactional scores to generate a transaction risk value.

12. The apparatus of claim 11, the keyboard fraud input detection module further comprising instructions that:
    compare the normalized transactional score to a second predetermined score indicative of possible fraud or error; and
    indicate (1) a low risk level when the normalized transaction score exceeds both the predetermined score and the second predetermined score, (2) a high risk level when the normalized transaction score does not exceed the predetermined score and does not exceed the second predetermined score, and (3) a moderate risk level when the normalized transaction score only exceeds one of the predetermined score or the second predetermined score.

13. A non-transitory storage medium for storing instructions adapted to be executed by a processor to perform a method for determining potential fraud in an electronic input of data via a keyboard during an online session, wherein said instructions comprise:

providing an electronic online form during an online session, the electronic online form comprising one or more user input fields, wherein electronic data entered into the one or more user input fields can be authenticated to detect fraudulent data entry;

obtaining keyboard configuration information regarding a configuration of a keyboard of the user device, the keyboard configuration information comprising, for each pair of keys on the keyboard, a distance value indicating a respective number of spaces between the pair of keys;

initiating a fraud detection algorithm that when executed by the one or more processors of the fraud detection server system, performs at least the following:

for each field of the one or more user input fields:

accessing a field data string input into the field, the field data string comprising a plurality of ordered keystrokes $k_1, k_2 \ldots k_n$ that have been entered into the field via the keyboard of the user device;

assigning a score to: a first keystroke $k_1$ of the plurality of ordered keystrokes based at least on whether the keystroke $k_1$ includes a shift key, wherein a determination that the keystroke $k_1$ includes the shift key increases the score; and to each of the remaining keystrokes $k_2 \ldots k_n$ based at least on: (1) a distance value of the keyboard configuration information for the respective keystroke and the previous keystroke, wherein a larger distance value results in the score having a higher value; and (2) whether the respective keystroke includes a shift key, wherein a determination that the keystroke includes the shift key increases the score;

summing the scores of at least three of the plurality of ordered keystrokes to generate a field data string score;

dividing the field data string score by a count of the scores used to determine the field data string score to obtain a normalized field data string score; and comparing the normalized field data string score to a predetermined value for normalized data string scores to generate a field risk value that indicates a risk that the keystrokes associated with the normalized field data string score were entered without regard to their meaning and are potentially fraudulent;

determining a transactional score based at least in part on one or more field risk values corresponding to the one or more user input fields;

determining, based on the transactional score, whether the transaction is potentially fraudulent; and in response to a determination that the transaction is potentially fraudulent, segregating the transaction for separate action.

14. The non-transitory storage medium of claim 13, wherein the score of keystroke $k_m$ is a whole number plus a least number of adjacent keys spaces between keystrokes $k_m$ and $k_{m-1}$.

15. The non-transitory storage medium of claim 14, wherein the score of keystroke $k_m$ is based upon a linear distance between keystrokes $k_m$ and $k_{m-1}$.

16. The non-transitory storage medium of claim 13, further comprising instructions for storing a credit card number entered into the electronic online form during the online transaction in a database of highly suspect information when a probability of error of fraud exceeds a predetermined threshold.

17. A system for determining potential fraud in an electronic input of data via a keyboard during an online session, the system comprising:

a non-transitory memory;

a fraud detection server system comprising one or more processors for executing instructions stored in modules and in electronic communication with the non-transitory memory;

an application module stored in the non-transitory memory, configured to conduct an online transaction with a user over a network via a user device of the user, and comprising instructions that, when executed by the one or more processors of the fraud detection server system, include:

providing an electronic online form during an online session for the online transaction, the electronic online form comprising one or more user input fields, wherein electronic data entered into the one or more user input fields can be authenticated to detect fraudulent data entry; and a keyboard fraud input detection module stored in the non-transitory memory and comprising instructions that, when executed by the one or more processors of the fraud detection server system, include:

obtaining keyboard configuration information regarding a configuration of a keyboard of the user device, the keyboard configuration information comprising, for each pair of keys on the keyboard, a distance value indicating a respective number of spaces between the pair of keys;

initiating a fraud detection algorithm that when executed by the one or more processors of the fraud detection server system, performs at least the following:

for each field of the one or more user input fields:

accessing a field data string input into the field, the field data string comprising a plurality of ordered keystrokes $k_1, k_2 \ldots k_n$ that have been entered into the field via the keyboard of the user device;

assigning a score to: the first keystroke $k_1$ of the plurality of ordered strokes based at least on whether the keystroke $k_1$ includes a shift key, wherein a determination that the keystroke $k_1$ includes the shift key increases the score; and to each of the remaining keystrokes $k_2 \ldots k_n$ based at least on: (1) a distance value of the keyboard configuration information for the respective keystroke and the previous keystroke, wherein a larger distance value results in the score having a higher value; (2) whether the respective keystroke includes a shift key, wherein a determination that respective keystroke includes the shift key increases the score; and summing the scores of at least three of the plurality of ordered keystrokes to generate a field data string score;

dividing the field data string score to obtain a normalized field data string score; and comparing the normalized field data string score to a predetermined value for normalized data string scores to generate a field risk value that indicates a risk that the keystrokes associated with the normalized field data string score were entered without regard to their meaning and are potentially fraudulent;

determining a transactional score based at least in part on one or more field risk values corresponding to the one or more user input fields;

determining, based on the transactional score, whether the online transaction is potentially fraudulent; and in response to a determination that the online transaction is potentially fraudulent, segregating the online transaction for separate action.

18. The system of claim 17, wherein determining the transaction score comprises:

calculating normalized string scores for each of the field data strings; and summing the normalized string scores to obtain the transactional score.

19. The system of claim 18, wherein determining, based on the transactional score, whether the online transaction is potentially fraudulent comprises:

dividing the sum of the normalized string scores by the number of strings in the sum to obtain a normalized transactional score; and comparing the normalized transactional score to a predetermined score indicative of possible fraud or error.

20. The system of claim 19, wherein the keyboard fraud input detection module comprising instructions that when executed by the one or more processors of the fraud detection server system, further include:

comparing the normalized transactional score to a second predetermined score indicative of possible fraud or error; and indicating (1) a low risk level when the normalized transaction score exceeds both the predetermined score and the second predetermined score, (2) a high risk level when the normalized transaction score does not exceed the predetermined score and does not exceed the second predetermined score, and (3) a moderate risk level when the normalized transaction score only exceeds one of the predetermined score or the second predetermined score.

* * * * *